United States Patent [19]

Mitchell et al.

[11] Patent Number: 4,799,105
[45] Date of Patent: Jan. 17, 1989

[54] MODIFIED TECHNIQUE FOR SUPPRESSION OF FLICKER IN INTERLACED VIDEO IMAGES

[75] Inventors: Joan L. Mitchell, Ossining; William B. Pennebaker, Carmel, both of N.Y.

[73] Assignee: International Business Machines Corporation, Armonk, N.Y.

[21] Appl. No.: 97,371

[22] Filed: Sep. 16, 1987

Related U.S. Application Data

[63] Continuation of Ser. No. 589,603, Mar. 14, 1984, abandoned.

[51] Int. Cl.$^4$ ............................................. H04N 5/14
[52] U.S. Cl. ..................................... 358/160; 358/166
[58] Field of Search ............... 358/160, 166, 167, 170, 358/36, 37

[56] References Cited

U.S. PATENT DOCUMENTS

| | | | |
|---|---|---|---|
| 4,215,414 | 7/1980 | Huelsman | 358/284 |
| 4,377,821 | 3/1983 | Sautter et al. | 358/160 |
| 4,412,251 | 10/1983 | Tanaka et al. | 358/160 |
| 4,506,298 | 3/1985 | Mansell et al. | 358/160 |

*Primary Examiner*—James J. Groody
*Assistant Examiner*—Michael D. Parker
*Attorney, Agent, or Firm*—Thomas P. Dowd

[57] ABSTRACT

A method for suppressing the perception of flicker in interlaced video images, includes the steps of: testing, each pixel in an image, for an intensity value below a first predetermined threshold; modifying, for each tested pixel, an intensity value representation for each nearest neighbor pixel along a first axis of said interlaced image having an intensity value exceeding a second predetermined threshold, if the intensity value of the tested pixel is below the first predetermined threshold; displaying, on a video display device, an interlaced image generated by the steps of testing and modifying, having a suppressed perception of flicker.

12 Claims, 3 Drawing Sheets

A IS PREVIOUS LINE BUFFER
B IS CURRENT LINE BUFFER
C IS NEXT LINE BUFFER
A IS Ith PIXEL IN A
B IS Ith PIXEL IN B
C IS Ith PIXEL IN C

MODIFIED TECHNIQUE FOR SUPPRESSION OF FLICKER IN INTERLACED VIDEO IMAGES

BACKGROUND OF THE INVENTION

1. Field of the Invention

The present invention relates to image processing and more particularly to methods and apparatus for flicker suppression in interlaced video images.

2. Description of the Prior Art

The following are systems representative of the prior art.

"Psuedogaussian Video Output Processing for Digital Display", U.S. Pat. No. 4,215,414, shows a method and apparatus for generating a psuedogaussian characteristic in the display of video information presented in digital form from a read-write memory that is continuously updated as required. Picture elements of each line read for display are summed with a predetermined fraction of the sum of the values of corresponding pixels of adjacent lines above and below the current line thus forming a vertical psuedogaussian calculation for the pixels of the current line. Horizontal psuedogaussian calculation of the pixels is then performed in a similar manner using two pixel delay elements connected in cascade and connected to an adder to sum values of pixels p−1 and p+1 as an input to a second adder which sums the output of the first adder divided by a predetermined value with the value of pixel p.

The flicker suppression method of the patent employs linear convolution techniques to provide an approximation of the gaussian characteristics of the signal source.

The patent does not teach a method of flicker suppression in accordance with the present invention where pixel intensity values are tested against a first threshold and then intensity values of adjacent pixels are may be modified or flagged to reduce the perception of flicker.

The prior art discussed above does not teach nor suggest the present invention as disclosed and claimed herein.

SUMMARY OF THE INVENTION

Therefore, it is an object of the present invention to suppress the perception of flicker in interlaced video images, by method and apparatus including: testing, each pixel in an image, for an intensity value below a first predetermined threshold; modifying, for said tested pixel, an intensity value representation for each nearest neighbor pixel along a first axis of said interlaced image having an intensity value exceeding a second predetermined threshold, if said intensity value of said tested pixel is below said first predetermined threshold; displaying, on a video display device, an interlaced image generated by said steps of testing and modifying, having a suppressed perception of flicker.

It is another object of the present invention to suppress the perception of flicker as above by method and apparatus further including: flagging an intensity value representation for each nearest neighbor pixel along a first axis of said interlaced image to identify each pixel which may require modification of intensity value.

It is another object of the present invention to suppress the perception of flicker as above by method and apparatus including: testing, each pixel in an image, for an intensity value below a first predetermined threshold; modifying, for each tested pixel, an intensity value representation of each nearest neighbor pixel, along a first axis of said interlaced image, if said intensity value of said neighbor pixel exceeds a second predetermined threshold; displaying on a video display device an interlaced image, generated by said steps of testing and modifying, having a suppressed perception of flicker.

It is yet another object of the present invention to suppress the perception of flicker as above by method and apparatus including: testing, each pixel in an image, for an intensity value below a first predetermined threshold; setting a flag for each nearest neighbor pixel along a first axis of said interlaced image, indicating that said intensity value of said tested pixel is below said first predetermined threshold; modifying, to a predetermined value, an intensity value of each flagged pixel having an intensity value exceeding a second predetermined threshold; displaying on a video display device an interlaced image, generated by said steps of testing and modifying, having a suppressed perception of flicker.

It is yet another object of the present invention to suppress the perception of flicker as above by method and apparatus including: testing, for each pixel in an image, for an intensity value exceeding a first predetermined threshold; modifying an intensity value representation of each tested pixel if along a first axis of said interlaced image the intensity value of either nearest neighbor pixel is below a second predetermined threshold; displaying on a video display device an interlaced image, generated by said steps of testing and modifying, having a suppressed perception of flicker.

Accordingly, method and apparatus, embodying the present invention, for suppressing the perception of flicker in interlaced video images, includes: testing, each pixel in an image, for an intensity value below a first predetermined threshold; modifying, for each tested pixel, an intensity value representation for each nearest neighbor pixel along a first axis of said interlaced image having an intensity value exceeding a second predetermined threshold, if the intensity value of the tested pixel is below the first predetermined threshold; displaying, on a video display device, an interlaced image generated by the steps of testing and modifying, having a suppressed perception of flicker.

The foregoing and other objects, features and advantages of the invention will be apparent from the more particular description of the preferred embodiments of the invention, as illustrated in the accompanying drawing.

BRIEF DESCRIPTION OF THE DRAWING

In the drawing, like elements are designated with similar reference numbers, and identical elements in different specific embodiments are designated by identical reference numbers.

DESCRIPTION OF PREFERRED EMBODIMENTS OF THE INVENTION

The present invention relates to a nonlinear method to reduce flicker perception in interlaced video images.

The invention is founded on the principle that only white or near white pixels vertically adjacent to black or near black pixels need be modified to suppress the perception of flicker in an interlaced video image.

The embodiments of the present invention as will be described below, may be readily implemented on many commercially available image processing systems such as an IBM Series/1 computer controlling a Grinnell model GMR 270 image processor.

In graphics images, a video signal often makes rapid transition between light and dark regions. If the display is an interlaced video image, rapid vertical changes can cause perception of flicker.

Experimentation has shown that modification of black or nearly black pixels has minimal effect on flicker suppression. Therefore, only white or nearly white pixels need have intensity values modified to reduce the visual perception of flicker. This fact greatly simplifies the implementation of the method according to the present invention.

Directly stated, the method according to the present invention recognizes the white or near white pixel with a vertical black or near-black neighbor and then reduces the intensity value of the white or near white pixel to a predetermined gray-white value. For the important case of the three level graphics image having intensity values identified as black, gray, and white, the table below indicates the type of transformation which would be made for a column of pixels. Assigning a hexadecimal value of C0 to white, 60 to gray and 00 to black, the column of pixels on the left (identified as original) would then be transformed to the column on the right (identified as transformed).

TABLE I

| original | transformed | notes |
|---|---|---|
| 60 | 60 | grays unchanged |
| C0 | C0 | no change, gray above/white below |
| C0 | C0 | no change, gray below/white above |
| 60 | 60 | grays unchanged |
| 00 | 00 | blacks unchanged |
| 00 | 00 | blacks unchanged |
| C0 | A0 | remapped, black above |
| C0 | C0 | no change, white above/below |

With this simple transformation the perception of flicker is greatly reduced, while the reduction in image quality is barely perceptible. As can be seen from Table I above, if a white pixel is vertically adjacent to a black pixel, the intensity value of the white pixel is modified from C0 to A0. The modified value (A0) was determined experimentally and it is appropriate for typical conditions. Although the hexadecimal value A0 has been found to be optimal for particular applications, other values may be appropriate for modification of white pixel values within the scope of the present invention.

Figure 1:
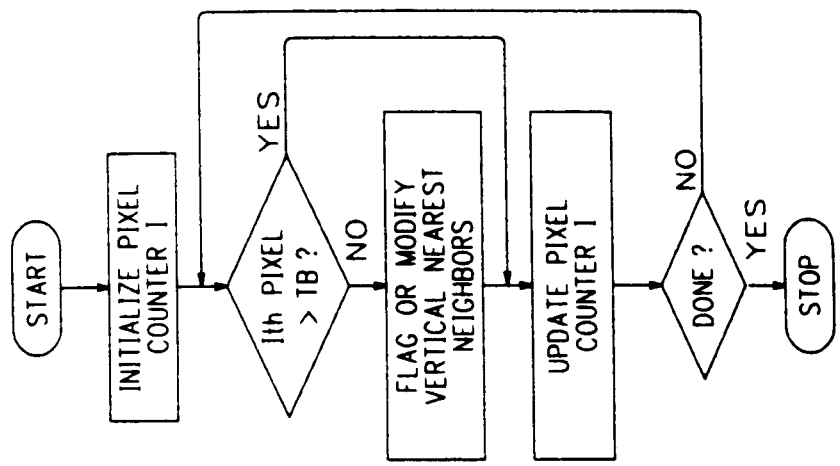
FIG. 1 is a flow diagram of a flicker suppression method according to the present invention.

A first embodiment of the method according to the present invention will now be described with reference to FIG. 1. FIG. 1 shows a flowchart of a general method for suppression of the perception of flicker in an interlaced video image.

The flowchart describes the method for each line in a video image.

A pixel counter I is initialized to the first pixel position in the line. Pixel i is tested against a first threshold. If the intensity value of pixel i is less than the first threshold then the pixel is considered to be black or near-black and one or more flag bits are set in the intensity value representations of the vertical nearest neighbor pixels. Alternatively, if the vertical nearest neighbor pixels have intensity values greater than A0, indicating white or near white pixels, the intensity values may be immediately modified to hexadecimal values A0.

If the intensity value of pixel i is greater than the first threshold value, then no action is taken to flag or modify nearest neighbor pixels since the flag or the modification of neighbor pixels only occurs in this first embodiment when a black or near black pixel is identified.

The pixel counter I is then updated and a next pixel is tested until the end of line is reached at which time a next line may be modified untilthe image has been completely flicker suppressed.

Figure 2:
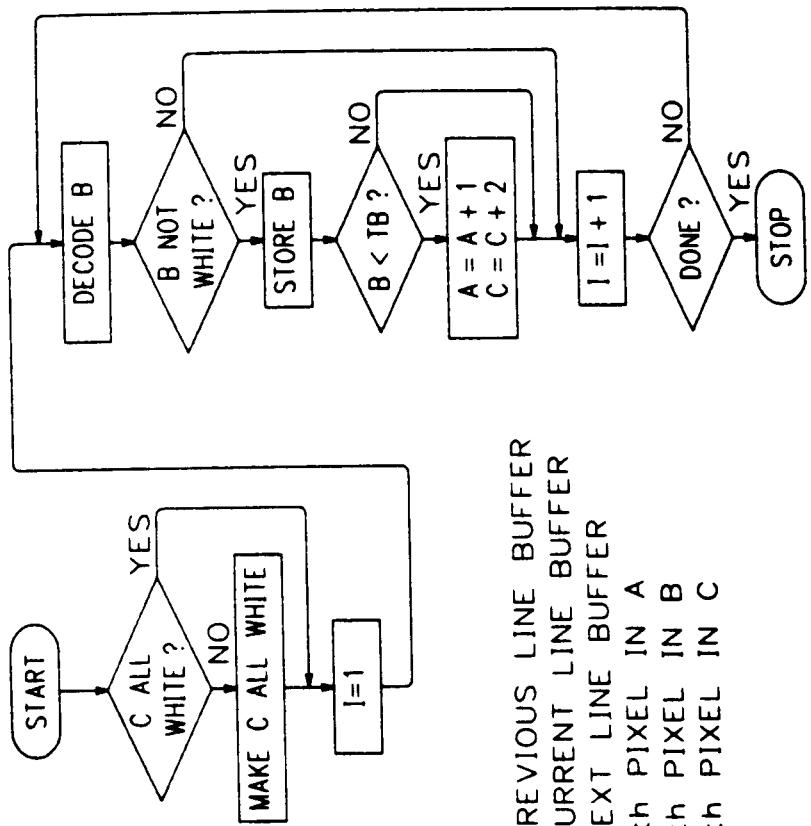
FIG. 2 is a flow diagram of a flicker suppression method according to a second embodiment of the present invention.

Referring to FIG. 2, a second embodiment of the flicker suppression method according to the present invention will be described. Three lines of the image are stored in line buffers with buffer A storing the previous line, buffer B storing the current line and buffer C storing the next line. Before each line is written, the next line buffer C is tested to determine if the contents represent all white pixels. If not, then buffer C is set to values representing all white pixels. Thus, whenever a black or nearly black pixel is decoded, the least significant bit in the buffer at the corresponding position in buffer C is set to flag a black in the line above and the next least significant bit for the current pixel position in the line is set in the preceding line buffer A to flag a black pixel in the line below. The decoded data representing the black or near-black pixel at the current pixel position in the line is entered in current line buffer B. These steps are shown in FIG. 2 by the blocks labeled decode b whereby is the ith pixel in buffer B and testing for b not in the white state. If the intensity value of pixel b is not white, then the intensity value of pixel is stored and tested against a threshold representing a black level. If the intensity value of b is less then the black threshold indicating b is a black or near-black pixel, then pixel a which is the ith pixel in the buffer A has a flag bit set in the least significant position and pixel c which is the ith pixel in next line buffer C has a flag bit set in the next to least significant bit position as described above.

Then, when the current line has been completely decoded, the preceding line stored in buffer A is transferred to a video buffer through a look up table having a transfer function such as shown in TABLE II below which modifies white or near-white pixel intensity values to a predetermined flicker suppression level such as hexadecimal A0 (identified in TABLE II below as G) if either of the two least significant bits is set indicating vertically adjacent black or near-black pixel either above or below the current pixel.

TABLE II

| OUTPUT LOOKUP TABLE | | | |
|---|---|---|---|
| Table Inputs | | | |
| flag black below | current | flag black above | Table Output |
| x | V <= G | x | V |
| 0 | V | 0 | V |
| 1 | V => G | x | G |
| x | V => G | 1 | G | x = don't care
G = suppression gray-white value
V = original intensity value

A program implementation of the method according to the present invention is shown below.

If (x(i,j+1)<T) or (x(i,j−1)<T and x(i,j)>G)

then x(i,j)=G endif

Where:
- i represents horizontal pixel position along a scan line;
- j represents line position in a vertical direction;
- T represents a black threshold; and
- G represents a modified flicker suppressed white intensity value.

Figure 3:
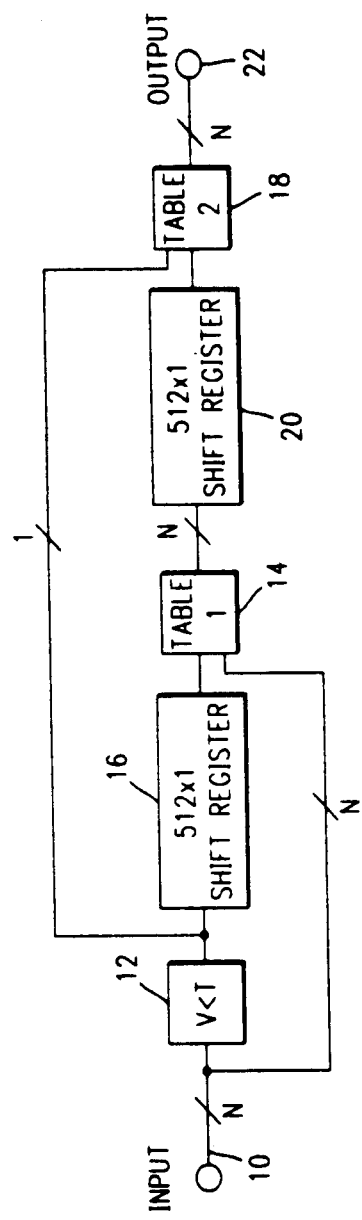
FIG. 3 is a block diagram of flicker suppression apparatus according to a third embodiment of the present invention.

Referring now to FIG. 3, an apparatus embodiment of the present invention will be described.

A digital video input appears at line 10 as an input to first threshold detector 12 and first lookup table 14. Detector 12 tests the intensity value of a current pixel against a first threshold representing black or near black. The output of detector 12 is connected to line buffer shift register 16 and to second lookup table 18. The output of line buffer 16 is connected to an input of first lookup table 14. Lookup tables 14 and 18 (which may be identical) provides an output intensity value for a current pixel which may be modified if a black or near black pixel was present at the same pixel position on the previous line as indicated by the output of line buffer 16 and the current pixel value is white or near white. The transfer function of lookup tables 14 and 18 is shown in Table III below.

Translation table for flicker suppression, assuming that the two low order bits flag the occurrence of black on the line above and/or the line below. Original data had values from 00 to C0 in steps of hex 10.

TABLE III

| | | | |
|---|---|---|---|
| 00 00 00 00 | 00 00 00 00 | 00 00 00 00 | 00 00 00 00 |
| 10 10 10 10 | 10 10 10 10 | 10 10 10 10 | 10 10 10 10 |
| 20 20 20 20 | 20 20 20 20 | 20 20 20 20 | 20 20 20 20 |
| 30 30 30 30 | 30 30 30 30 | 30 30 30 30 | 30 30 30 30 |
| 40 40 40 40 | 40 40 40 40 | 40 40 40 40 | 40 40 40 40 |
| 50 50 50 50 | 50 50 50 50 | 50 50 50 50 | 50 50 50 50 |
| 60 60 60 60 | 60 60 60 60 | 60 60 60 60 | 60 60 60 60 |
| 70 70 70 70 | 70 70 70 70 | 70 70 70 70 | 70 70 70 70 |
| 80 80 80 80 | 80 80 80 80 | 80 80 80 80 | 80 80 80 80 |
| 90 90 90 90 | 90 90 90 90 | 90 90 90 90 | 90 90 90 90 |
| A0 A0 A0 A0 | A0 A0 A0 A0 | A0 A0 A0 A0 | A0 A0 A0 A0 |
| B0 A0 A0 A0 | B0 A0 A0 A0 | B0 A0 A0 A0 | B0 A0 A0 A0 |
| C0 A0 A0 A0 | C0 A0 A0 A0 | C0 A0 A0 A0 | C0 A0 A0 A0 |
| C0 A0 A0 A0 | C0 A0 A0 A0 | C0 A0 A0 A0 | C0 A0 A0 A0 |
| C0 A0 A0 A0 | C0 A0 A0 A0 | C0 A0 A0 A0 | C0 A0 A0 A0 |
| C0 A0 A0 A0 | C0 A0 A0 A0 | C0·A0 A0 A0 | C0 A0 A0 A0 |

It should be noted that there is a one line delay built into the flicker suppression circuit between input 10 and output 22.

The output of lookup table 14 is passed through line buffer 20 and presented to lookup table 18 at the same time as an output of detector 12 which indicates whether the current pixel position on the next line is black or near black.

Lookup table 18 then operates in the same manner as lookup table 14 but with respect to a black or near black pixel on the next line in which case the intensity value of the current pixel may be modified if above a suppression value such as A0.

If the special case of a white or near white pixel on the current line sandwiched by black or near black pixels on the previous line and on the next line, lookup table 18 may be structured to produce a second suppression value of lower intensity value than the A0 suppression value to provide greater suppression of flicker when a white pixel is sandwiched between two black pixels. The second suppression value may be set to 90 or 80.

Thus, while the invention has been described with reference to preferred embodiments thereof, it will be understood by those skilled in the art that various changes in form and details may be made without departing from the scope of the invention.

What is claimed is:

1. A method for suppressing the perception of flicker in interlaced video images, comprising the steps of:
   - testing, each pixel in an image, for an intensity value;
   - comparing said intensity values to a first predetermined threshold value;
   - modifying, for only those tested pixels with an intensity value below said first predetermined threshold value, and intensity value representation for each nearest neighbor pixel along a first axis of said interlaced image having an intensity value exceeding a second predetermined threshold value greater than said first predetermined threshold value; and
   - displaying, on a video display device, an interlaced image generated by said steps of testing, comparing, and modifying, having a suppressed perception of flicker.

2. A method according to claim 1, further comprising the step of flagging an intensity value representation for each nearest neighbor pixel along said first axis of said interlaced image to identify each pixel which requires modification of intensity value.

3. A method for suppressing the perception of flicker in interlaced video images, comprising the steps of:
   - testing, each pixel in an image, for an intensity value;
   - comparing said intensity values to a first predetermined threshold value;
   - setting, for only those pixels with an intensity value below said first predetermined threshold value, a flag for each nearest neighbor pixel along a first axis of said interlaced image; modifying, to a predetermined value, the intensity value of each flagged pixel having an intensity value exceeding a second predetermined threshold value greater than said first predetermined threshold value; and
   - displaying on a video display device an interlaced image, generated by said steps of testing, comparing, setting, and modifying, having a suppressed perception of flicker.

4. A method for suppressing the perception of flicker in interlaced video images, comprising the steps of:
   - testing, the intensity values of pixels in an image, for an intensity value exceeding a first predetermined threshold value;
   - modifying an intensity value representation of each tested pixel having an intensity value exceeding said first predetermined threshold value, to a first suppression value when along a first axis of said interlaced image the intensity value of either nearest neighbor pixel is below a second predetermined threshold value less than said first predetermined threshold value; and
   - displaying on a video display device an interlaced image, generated by said steps of testing and modifying, having a suppressed perception of flicker.

5. A method according to claim 4, wherein said modifying step further comprises: modifying said intensity value representation of each tested pixel having an intensity value exceeding said first predetermined threshold value, to a second suppression value when along said first axis of said interlaced image the intensity values of both nearest neighbor pixels are below said second predetermined threshold.

6. A method according to claim 5, wherein said second suppression value has a lower intensity value than said first suppression value.

7. Apparatus for suppressing the perception of flicker in interlaced video images, comprising:
- means for testing, each pixel in an image, for an intensity value;
- means for comparing said intensity values to a first predetermined threshold value;
- means for modifying, for only those tested pixels with an intensity value below said first predetermined threshold value, an intensity value representation for each nearest neighbor pixel along a first axis of said interlaced image having an intensity value exceeding a second predetermined threshold value greater than said first predetermined threshold value; and
- means for displaying, on a video display device, an interlaced image generated by said testing, comparing, and modifying means, having a suppressed perception of flicker.

8. Apparatus according to claim 7, further comprising: means for flagging an intensity value representation for each nearest neighbor pixel along said first axis of said interlaced image to identify each pixel which requires modification of intensity value.

9. Apparatus for suppressing the perception of flicker in interlaced video images, comprising:
- means for testing, each pixel in an image, for an intensity value;
- means for comparing said intensity values to a first predetermined threshold value;
- means for setting, for only those pixels with an intensity value below said first predetermined threshold value, a flag for each nearest neighbor pixel along a first axis of said interlaced image;
- means for modifying, to a predetermined value, the intensity value of each flagged pixel having an intensity value exceeding a second predetermined threshold value greater than said first predetermined threshold value; and
- means for displaying on a video display device an interlace image, generated by said testing comparing, setting, and modifying means, having a suppressed perception of flicker.

10. Apparatus for suppressing the perceeption of flicker in interlaced video images, comprising:
- means for testing, the intensity values of pixels in an image, for an intensity value exceeding a first predetermined threshold value;
- means for modifying an intensity value representation of each tested pixel having an intensity value exceeding said first predetermined threshold value, to a first suppression value when along a first axis of said interlaced image the intensity value of either nearest neighbor pixel is below a second predetermined threshold value less than said first predetermined threshold value; and
- means for displaying on a video display device an interlaced image, generated by said testing and modifying means, having a suppressed perception of flicker.

11. Apparatus according to claim 10, wherein said means for modifying further comprises: means for modifying said intensity value representation of each tested pixel having an intensity value exceeding said first predetermined threshold value, to a second suppression value when along said first axis of said interlaced image the intensity values of both nearest neighbor pixels are below said second predetermined threshold.

12. Apparatus according to claim 11, wherein said second suppression value has a lower intensity value than said first suppression value.

* * * * *